United States Patent Office 2,958,670
Patented Nov. 1, 1960

2,958,670

COMPOSITIONS AND FIBERS CONTAINING ACRYLONITRILE POLYMER BLENDS AND METHOD OF MAKING

Weston Andrew Hare, Wilmington, Del., assignor to E. I. du Pont de Nemours and Company, Wilmington, Del., a corporation of Delaware.

No Drawing. Filed Dec. 12, 1957, Ser. No. 702,225

13 Claims. (Cl. 260—32.6)

This invention relates to polymer compositions comprising polyacrylonitrile and to articles obtained therefrom.

Polyacrylonitrile is of importance in the textile field because of its good fiber-forming qualities and the desirable aesthetic and durability properties of the resulting fibers. Of particular value are those fibers of acrylonitrile polymers which contain at least 85% by weight combined acrylonitrile. One deficiency in such fibers is a lack of sufficient durability in knit fabrics. This is particularly true in the case of garments which are normally subjected to a considerable amount of abrasive wear, for example, men's hosiery.

For ease in processing, it is desirable to improve the tenacity of fibers, particularly where this can be done with no decrease in their elongation.

It is, therefore, an object of this invention to provide acrylonitrile fibers of improved abrasion resistance. It is a further object to provide fibers having an unusually high tenacity and elongation. Still other objects will appear hereinafter.

These objects are accomplished by spinning fibers from spinning solutions comprising blends of acrylonitrile polymers which are widely different in their molecular weights, particularly blends containing small amounts of polymer of unusually high molecular weight.

In particular, these objects are accomplished by preparing a blend of a low intrinsic viscosity acrylonitrile polymer having an intrinsic viscosity of between about 1.25 and about 2.0 with about 5% to about 25% by weight (based upon total weight of the blend) of a high intrinsic viscosity acrylonitrile polymer having an intrinsic viscosity of at least 5 and preferably between about 8 and about 10. Such a blend is then dissolved in an organic solvent for acrylonitrile polymers to produce a spinning solution which is then spun into filaments having good physical properties and containing from about 2% to about 25% by weight of the high intrinsic viscosity acrylonitrile polymer.

This is indeed surprising because it has been thought in the past that narrow molecular weight distribution is desirable for fibers having good physical properties. Both U.S. 2,628,223 to Richards and U.S. 2,654,731 to Patterson teach that polymers of broad molecular weight distribution produce fibers with poor physical properties.

The acrylonitrile polymers of this invention are those polymers containing at least 85% by weight of combined acrylonitrile, including acrylonitrile homopolymer and any copolymer of at least about 85% by weight of acrylonitrile with at least one copolymerizable monomer containing an ethylenically unsaturated group, added to improve dyeability or for other purposes.

The following examples are intended to be illustrative rather than limitative and set forth preferred forms of the invention. All parts, percentages, and proportions are by weight unless otherwise specified.

The expression, "intrinsic viscosity" with the symbol (N) as used herein signifies the value of $1n$ of $(N_r)$ at the ordinate axis intercept (i.e., $C=0$) in a graph of $$\frac{1n\ (N_r)}{C}$$

as ordinate with C values (grams per 100 milliliter of solution) as abscissa. The symbol $(N_r)$ refers to relative viscosity which is the ratio of the flow times in a viscosimeter of a polymer solution and the solvent. The symbol $1n$ is logarithm to the base $e$. All measurements on polymers containing acrylonitrile are made with dimethylformamide solutions at 25° C.

EXAMPLE I

This example describes the preparation of an acrylonitrile polymer of high intrinsic viscosity.

The following materials are placed in a ten-gallon glass-lined kettle blanketed with nitrogen to exclude all air:

| | | |
|---|---|---|
| Water | kilograms | 16.4 |
| Sodium "Lorol" sulfate | grams | 258 |
| Potassium persulfate | do | 13.6 |
| Sodium bisulfite | do | 0.303 |

The water is distilled and then deaerated by boiling under reduced pressure before being placed in the vessel. The sodium "Lorol" sulfate is next added and the combination is stirred and warmed to 40.5° C. before addition of the potassium persulfate and sodium bisulfite. Nitrogen is kept in the vessel at all times. Stirring is continued for 15 minutes after the addition of all of the above ingredients in order to insure their complete solution. Acrylonitrile is then added to the vessel, with stirring, at a rate of 160 to 170 milliliters per minute until a total of 10.4 kilograms is added. Stirring is continued for 30 minutes after addition of the acrylonitrile is completed. Polymerization starts 2 or 3 minutes after the addition of acrylonitrile is begun and is evidenced by the appearance of a blue haze within the reaction medium. After the stirring is stopped, the reaction mixture is cooled to 20° C., screened and filtered through sand to remove lumps, evaporated to dryness and pulverized. Its intrinsic viscosity as measured in N,N-dimethylformamide is 8.2.

By slight changes in potassium persulfate and sodium bisulfite concentrations, polymers varying in intrinsic viscosity between 5 and 15 are prepared.

EXAMPLE II

A solution of 2.6% polyacrylonitrile having an intrinsic viscosity of 9.0 and 12.9% of a copolymer of 94% acrylonitrile and 6% methyl acrylate, this copolymer having an intrinsic viscosity of 1.4, is made in dimethylformamide by adding a blend of 260 grams of the polyacrylonitrile and 1290 grams of the copolymer to 8450 grams of N,N-dimethylformamide at 60° C., with stirring. The resulting slurry is then heated to 80° C., to effect complete solution of the polymers. The solution so produced is then dry spun to a 440-denier, 30-filament yarn. The spun yarn is extracted with water at room temperature to remove the solvent, drawn 6× in low pressure steam, and allowed to relax 16% in length during passage over heated rolls. Different samples of the extracted yarn are drawn 5× and 6.8× in low pressure steam and allowed to relax 16% in length during passage over heated rolls. Expression of draw ratios in 5×, for example, means that the original length of the yarn is increased by a multiple of 5.

A control yarn is prepared by spinning a 25.5% solution in dimethylformamide of a 94% acrylonitrile, 6% methyl acrylate copolymer with intrinsic viscosity of 1.7, prepared in a similar manner.

The spun yarn is extracted with water at room temperature, drawn 6× in low pressure steam and then allowed to relax 16% on heated rolls.

Apparatus for measuring the abrasion resistance of yarns consists of a reciprocating bar mounted 3 inches above a horizontal Alsimag pin, ⅛ inch in diameter. One end of the yarn strand is attached to the reciprocating bar and the strand is then caused to pass 360° around the pin, thence 180° around the portion of itself leading from the reciprocating bar to the pin, and thence 90° around the pin in the direction whence it came, the free end hanging vertically and being attached to a 30-gram weight. The reciprocating motion of the bar causes the yarn to rub on the Alsimag pin and on itself. This motion is continued for a sufficient number of cycles to cut the yarn completely in two.

Using this apparatus, the four yarn samples are measured for abrasion resistance, a sufficient number of strands on each sample being used to give reliable results. The data in the following table show the abrasion resistance in number of cycles required to break the yarn, and the straight tenacities and elongations of the control yarn drawn 6× and of the yarns from mixtures of polymers of different inherent viscosities drawn 5×, 6× and 6.8×.

*Table*

|         | Straight Tenacity, grams per denier | Straight Elongation, percent | Abrasion Resistance, cycles |
|---------|---------|---------|---------|
| Control | 3.4 | 19 | 2,466 |
| 5×      | 3.8 | 23 | 2,890 |
| 6×      | 4.5 | 21 | 2,620 |
| 6.8×    | 4.9 | 20 | 2,400 |

These various data show that at the same draw ratio the yarn prepared from a polymer mixture containing polymer of very high intrinsic viscosity is superior to the control yarn with regard to straight tenacity, straight elongation, and abrasion resistance. By reducing the draw ratio of the yarn from this mixture of polymers, its abrasion resistance is increased even more without lowering the tenacity below that of the control yarn and while increasing the elongation at the same time. By increasing the draw ratio to 6.8×, a substantial increase in tenacity over that of the control is obtained while maintaining the same elongation and essentially the same abrasion resistance.

EXAMPLE III

Polyacrylonitrile in the amount of 0.27 pound, made as in Example I, and having an intrinsic viscosity of 8.5 is dampened with 0.05 pound of water and slurried with 10.0 pounds of N,N-dimethylformamide at room temperature. The slurry is then heated to 100° C. to dissolve the polymer. The resulting solution is cooled to 50° C. and 1.33 pounds of a copolymer consisting of 94% acrylonitrile and 6% methyl acrylate with intrinsic viscosity of 1.44 is added with agitation. The resulting slurry is converted to a solution by passage through a heat exchanger at 100° C. It is then dry spun using a 30-hole spinneret, extracted with water at 30° C., and drawn 5× in steam to produce a 69-denier drawn yarn. A control yarn is similarly prepared starting with a solution of 2.6 pounds of a copolymer of 94% acrylonitrile and 6% methyl acrylate, having an intrinsic viscosity of 1.7, in 7.4 pounds of dimethylformamide. The yarn containing the high intrinsic viscosity polymer shows a straight tenacity of 3.5 grams per denier and a straight elongation of 18.7% as compared to a tenacity of only 3.0 grams per denier and a straight elongation of 17.5% for the control yarn. Use of a small amount of water results in a smoother solution.

EXAMPLE IV

A solution of 3.7% polyacrylonitrile of 5.3 intrinsic viscosity and 13.3% polyacrylonitrile of 1.7 intrinsic viscosity is prepared in dimethylformamide by the method of Example III using 0.37 pound high intrinsic viscosity polyacrylonitrile, 1.33 pounds low intrinsic viscosity polyacrylonitrile in 8.30 pounds of N,N-dimethylformamide. For a control, a 26% solution of polyacrylonitrile of 1.7 intrinsic viscosity in N,N-dimethylformamide is prepared in a similar manner using 2.6 pounds of polyacrylonitrile, and 7.4 pounds of N,N-dimethylformamide. Each solution is dry spun through a 30-hole spinneret and the spun yarns so obtained are extracted with water at room temperature, drawn 3×, and relaxed 15% according to the processes described in the previous examples. The control yarn has a denier of 93.4, a straight tenacity of 3.06 grams per denier and a straight elongation of 21.0%. The yarn containing the high intrinsic viscosity polymer, which is of 97.2 denier, has a straight tenacity of 3.18 grams per denier and a straight elongation of 23.3%.

Samples of the same spun yarns are extracted and drawn 5× in steam followed by relaxation on hot rolls to give products of 71.6 denier for the control and 73.5 denier for the item containing high intrinsic viscosity polymer. The products are found to have a straight tenacity of only 4.09 grams per denier and a straight elongation of 19.8% for the control item as compared to a straight tenacity of 4.45 grams per denier and 20.5% elongation for the high intrinsic viscosity item.

EXAMPLE V

A solution of 5.5 grams of polyacrylonitrile having an intrinsic viscosity of 8.2 is prepared in 250 grams of N,N-dimethylformamide and the resulting solution is used to dissolve 87.5 grams of a 94% acrylonitrile, 6% methylacrylate copolymer of intrinsic viscosity 1.67. A yarn of 8× draw ratio is prepared from this solution by the procedure of the previous examples, together with a control yarn from a solution of the copolymer alone having no added material of high intrinsic viscosity. Each yarn is placed for 10 minutes under a load of 0.2 gram per denier in a container filled with atmospheric steam. The control yarn increases in length by 9.1%, while the yarn containing high intrinsic viscosity polymer increases in length by only 5.3%. The yarns are then returned to the steam chamber with no load attached and in this experiment, the control yarn recovers 83.9%, while the yarn containing high intrinsic viscosity polymer recovers 93.3% from its extension. This experiment shows that yarns prepared with the addition of high intrinsic viscosity polymer show a greater resistance to deformation under hot wet conditions and a greater recovery from such deformation.

The high intrinsic viscosity acrylonitrile polymers which are useful in this invention have an intrinsic viscosity as measured in N,N-dimethylformamide solution of at least 5. Those polymers of intrinsic viscosity between 8 and 10 are particularly desirable. These high intrinsic viscosity acrylonitrile polymers are added in the extent of about 5% to about 25%, based on total acrylonitrile polymer weight in the preparation of spinning solutions, the remaining proportion of the polymer being low intrinsic viscosity acrylonitrile polymer of intrinsic viscosity between about 1.25 and about 2.0. The acrylonitrile polymers comprising the homopolymer of acrylonitrile (polyacrylonitrile) and the copolymers containing about 5 to about 10% of methyl acrylate are particularly desirable. However, this invention is not limited to these polymers but includes the copolymers of acrylonitrile with vinyl acetate, methyl vinyl ketone, methyl methacrylate, dimethyl itaconate, butyl methacrylate, methacrylonitrile, styrene, acrylic acid, vinyl pyridine, vinyl imidazole or any other monomer given in Jacobson U.S. 2,436,926 provided that the acrylonitrile content of the polymer is always at least 85%.

As spinning solvent, I prefer to use dimethylformamide, for reasons of ease at handling, low boiling point, etc. However, any of the organic solvents normally used for acrylonitrile polymer spinning, e.g. dimethylacetamide, gamma-butyrolactone, tetramethylene cyclic sulfone, ethylene cyclic carbonate, or dimethylsulfoxide, may be used. The organic solvents for acrylonitrile polymers shown in "Vinyl and Related Polymers," Schildnecht, Wiley, New York, 1952, pages 270 and 271, are also suitable for use.

The solutions of polymers in solvent may be used for film casting. They may also be spun into filaments by either dry spinning or wet spinning processes. After removing most of the solvent, the spun fibers may be drawn either in steam or under the influence of dry heat, in order to produce fibers having improved tensile properties. These properties may be improved still more by allowing the fibers to relax about 15 to 20%, again under the influence of heat.

The products of my invention are useful as fibers for the preparation of wearing apparel of both woven and knit construction. They are likewise useful for the preparation of industrial-type fabrics, for example, filter cloths where resistance to abrasion is an important property.

A great advantage of the invention lies in the improved abrasion properties of my fibers. The durability of fabrics has been found to be dependent on the product of fiber abrasion resistance, measured as defined in this patent, and fiber tenacity. By practice of this invention, this product has been increased by at least about 40%. The invention likewise allows simultaneous increase of both tenacity and elongation of fibers and produces fibers which are superior in their resistance to deformation under hot wet conditions.

I claim:

1. Composition of matter consisting of a low intrinsic viscosity acrylonitrile polymer selected from the group consisting of (1) polyacrylonitrile and (2) a copolymer of at least about 85% by weight of acrylonitrile with at least one copolymerizable monomer containing an ethylenically unsaturated group, said polymer having an intrinsic viscosity of between about 1.25 and about 2.0 in a mixture with from about 2% to about 25% by weight of the mixture of a high intrinsic viscosity acrylonitrile polymer selected from the group consisting of (1) polyacrylonitrile and (2) a copolymer of at least about 85% by weight of acrylonitrile with at least one copolymerizable monomer containing an ethylenically unsaturated group, said high intrinsic viscosity polymer having an intrinsic viscosity of at least about 5.0.

2. The composition of claim 1 wherein the low intrinsic viscosity acrylonitrile polymer comprises a copolymer of acrylonitrile with about 5% to about 10% by weight of combined methyl acrylate.

3. The composition of claim 2 wherein the high intrinsic viscosity acrylonitrile polymer comprises polyacrylonitrile.

4. The composition of claim 1 wherein the high intrinsic viscosity acrylonitrile polymer comprises polyacrylonitrile.

5. The composition of claim 4 wherein the low intrinsic viscosity acrylonitrile polymer comprises polyacrylonitrile.

6. The composition of claim 1 wherein the high intrinsic viscosity acrylonitrile polymer has an intrinsic viscosity of between about 8.0 and 10.0.

7. A fiber comprising a polymer blend consisting of a polymer selected from the group consisting of (1) polyacrylonitrile and (2) a copolymer of at least about 85% by weight of acrylonitrile with at least one copolymerizable monomer containing an ethylenically unsaturated group, said polymer having an intrinsic viscosity of from about 1.25 to about 2.0 and from about 2% to about 25% by weight of a polymer selected from the group consisting of (1) polyacrylonitrile and (2) a copolymer of at least about 85% by weight of acrylonitrile with at least one copolymerizable monomer containing an ethylenically unsaturated group, said polymer having an intrinsic viscosity of at least about 5.

8. A spinning solution comprising a blend, in an organic solvent, consisting of from about 2% to about 25% by weight of the blend of a high intrinsic viscosity acrylonitrile polymer with a low intrinsic viscosity acrylonitrile polymer, each said acrylonitrile polymer being selected from the group consisting of (1) polyacrylonitrile and (2) a copolymer of at least about 85% by weight of acrylonitrile with at least one copolymerizable monomer containing an ethylenically unsaturated group.

9. The spinning solution of claim 8 wherein the organic solvent comprises N,N-dimethylformamide.

10. The spinning solution of claim 8 wherein the high intrinsic viscosity acrylonitrile polymer has an intrinsic viscosity of at least 5 and the low intrinsic viscosity acrylonitrile polymer has an intrinsic viscosity of between about 1.25 and about 2.0.

11. The process comprising the steps of dissolving in an organic solvent, a blend consisting of a high and a low intrinsic viscosity acrylonitrile polymer each being selected from the group consisting of (1) polyacrylonitrile and (2) a copolymer of at least about 85% by weight of acrylonitrile with at least one copolymerizable monomer containing an ethylenically unsaturated group, said high intrinsic viscosity polymer having an intrinsic viscosity of at least 5 and said low intrinsic viscosity acrylonitrile polymer having an intrinsic viscosity of from about 1.25 to about 2.0.

12. Process of claim 11 wherein the high intrinsic viscosity acrylonitrile polymer has an intrinsic viscosity of between about 8.0 and about 10.0.

13. The process comprising the steps of dissolving in an organic solvent, a blend consisting of a high and a low intrinsic viscosity acrylonitrile polymer each being selected from the group consisting of (1) polyacrylonitrile and (2) a copolymer of at least about 85% by weight of acrylonitrile with at least one copolymerizable monomer containing an ethylenically unsaturated group, said high intrinsic viscosity polymer having an intrinsic viscosity of at least 5 and said low intrinsic viscosity acrylonitrile polymer having an intrinsic viscosity of from about 1.25 to about 2.0, and forming the solution into a filament comprising from about 2 to about 25% by weight of the high intrinsic viscosity polymer.

References Cited in the file of this patent

UNITED STATES PATENTS

| | | |
|---|---|---|
| 2,688,008 | Chaney et al. | Aug. 31, 1954 |
| 2,776,270 | Coover et al. | Jan. 1, 1957 |
| 2,841,568 | Craig et al. | July 1, 1958 |